UNITED STATES PATENT OFFICE.

EDUARD ULLRICH, OF HÖCHST-ON-THE-MAIN, GERMANY, ASSIGNOR TO THE FARBWERKE, VORMALS MEISTER, LUCIUS & BRÜNING, OF SAME PLACE.

BLUE COLORING-MATTER FORMED FROM PARANITROSO-METHYLDIPHENYLAMINE ON PHENOLS OR OXYCARBONIC ACIDS.

SPECIFICATION forming part of Letters Patent No. 366,357, dated July 12, 1887.

Application filed March 16, 1887. Serial No. 231,144. (No specimens.)

*To all whom it may concern:*

Be it known that I, EDUARD ULLRICH, doctor of philosophy, a citizen of the Empire of Germany, residing at Höchst-on-the-Main, in the Empire of Germany, have invented certain new and useful Improvements in Blue Coloring-Matter; and I do hereby declare the following to be a full, clear, and exact description of the invention, such as will enable others skilled in the art to which it appertains to make and use the same.

This invention relates to the manufacture of a blue coloring-matter or dye-stuff by the action of paranitroso-methyldiphenylamine on phenols or oxycarbonic acids.

In carrying out my invention I proceed as follows: The paranitroso-methyldiphenylamine $NCH_3 \diagdown^{C_6H_4NO}_{C_6H_5}$ is prepared from methyldiphenylamine, $NCH_3 \diagdown^{C_6H_5}_{C_6H_5}$, which for this purpose is dissolved in a suitable dissolving agent, such as alcohol or glacial acetic acid, to which has been added some concentrated hydrochloric acid, or into which hydrochloric-acid gas has been allowed to flow.

Example: Nineteen parts of methyldiphenylamine is dissolved in sixty-seven parts of glacial acetic acid, into which about twelve parts of hydrochloric-acid gas has been allowed to flow. Afterward is added, slowly and while cooling well, seven parts of nitrite, previously dissolved in ten parts of water. To the nitroso compound thus obtained is added thirty-eight parts of gallic acid, and the solution heated in a water bath until it has taken a blue coloring. Now the mass is poured into water neutralized by caustic soda and the coloring-matter formed filtered off from the liquid.

The coloring-matter is in form of a dark-blue paste, insoluble in cold water, and with difficulty soluble in hot water. In dyeing, as well as in printing, it is fixed on the fiber by means of chrome or iron mordants, with the addition of acetate of lime.

What I claim as new, and desire to secure by Letters Patent, is—

As a new manufacture, the blue coloring-matter or dye-stuff prepared by the action of paranitroso-methyldiphenylamine on phenols or oxycarbonic acids, substantially as described.

In testimony whereof I affix my signature in presence of two witnesses.

EDUARD ULLRICH.

Witnesses:
ALVESTO S. HOGUE,
JEAN GRUND.